US010569811B2

(12) United States Patent
Lang

(10) Patent No.: US 10,569,811 B2
(45) Date of Patent: Feb. 25, 2020

(54) MODULAR TRANSPORTATION AND STORAGE SYSTEM

(71) Applicant: Ice Door Systems Pty Ltd, East Brisbane (AU)

(72) Inventor: Robert Lang, Sanctuary Cove (AU)

(73) Assignee: Ice Door Systems Pty Ltd, Brisbone (AU)

( * ) Notice: Subject to any disclaimer, the term of this patent is extended or adjusted under 35 U.S.C. 154(b) by 103 days.

(21) Appl. No.: 15/771,397

(22) PCT Filed: Nov. 4, 2016

(86) PCT No.: PCT/AU2016/051058
§ 371 (c)(1),
(2) Date: Apr. 26, 2018

(87) PCT Pub. No.: WO2017/079789
PCT Pub. Date: May 18, 2017

(65) Prior Publication Data
US 2018/0334197 A1 Nov. 22, 2018

(30) Foreign Application Priority Data

Nov. 10, 2015 (AU) .................................. 2015904608
Jul. 19, 2016 (AU) .................................. 2016902841

(51) Int. Cl.
B62D 33/02 (2006.01)
B60P 1/64 (2006.01)
B60P 3/40 (2006.01)
B60P 3/42 (2006.01)
B62D 24/00 (2006.01)

(52) U.S. Cl.
CPC ............ *B62D 33/02* (2013.01); *B60P 1/6409* (2013.01); *B60P 3/42* (2013.01); *B62D 24/00* (2013.01); *B60P 1/64* (2013.01); *B60P 3/40* (2013.01)

(58) Field of Classification Search
CPC .. B60P 1/64; B60P 1/6445; B60P 3/40; B60P 3/42; B60P 1/6409; B62D 33/02; B62D 24/00
USPC .............................................. 296/35.3, 184.1
See application file for complete search history.

(56) References Cited

U.S. PATENT DOCUMENTS

| 3,416,465 | A | * | 12/1968 | Turpen | B62D 53/06 105/422 |
| 4,321,000 | A | * | 3/1982 | Novak | B65D 90/0013 248/351 |
| 4,339,148 | A | * | 7/1982 | Smith | B62D 21/186 105/363 |
| 4,737,055 | A | * | 4/1988 | Scully | B60P 7/13 114/75 |
| 6,155,770 | A | * | 12/2000 | Warhurst | B60P 1/6445 414/347 |
| 6,733,067 | B1 | * | 5/2004 | Miskech | B62D 25/2054 296/183.1 |

(Continued)

FOREIGN PATENT DOCUMENTS

| FR | 2734525 | 11/1996 |
| GB | 870035 | 6/1961 |
| GB | 1485752 | 9/1977 |

*Primary Examiner* — Gregory A Blankenship
(74) *Attorney, Agent, or Firm* — Martin IP Pty Ltd

(57) ABSTRACT

The present invention relates to an improved truck and tray assembly and system for storing and transporting light weight building material such as timber and hardware.

18 Claims, 8 Drawing Sheets

(56) References Cited

U.S. PATENT DOCUMENTS

| | | | | |
|---|---|---|---|---|
| 8,899,661 | B2* | 12/2014 | Knox | B60P 1/00 |
| | | | | 296/184.1 |
| 9,499,203 | B1* | 11/2016 | Finley | B62D 21/10 |
| 2004/0245805 | A1* | 12/2004 | Jaeck | B60P 3/14 |
| | | | | 296/182.1 |
| 2006/0099044 | A1* | 5/2006 | Johnson | B60P 3/07 |
| | | | | 410/97 |
| 2009/0072564 | A1* | 3/2009 | Teeple | B60P 1/548 |
| | | | | 296/10 |
| 2012/0189422 | A1* | 7/2012 | Learned | B60P 1/6445 |
| | | | | 414/809 |
| 2015/0274060 | A1* | 10/2015 | Welch | B62D 25/2054 |
| | | | | 296/184.1 |
| 2017/0197679 | A1* | 7/2017 | Scaringe | B60K 1/00 |
| 2018/0050623 | A1* | 2/2018 | Harel | B60P 1/6445 |
| 2018/0334197 | A1* | 11/2018 | Lang | B60P 3/42 |
| 2018/0370743 | A1* | 12/2018 | Oh | B65G 67/02 |
| 2019/0135157 | A1* | 5/2019 | Harel | B60P 1/6445 |

* cited by examiner

TRAY DECK (1)

STANDARD CONTAINER LOCK (7)

STANDARD CONTAINER LOCK (7)
MOUNTING RECEPTACLE (4)

MODULAR TRANSPORTATION AND STORAGE SYSTEM

TECHNICAL FIELD

The present invention relates to an improved truck and tray assembly and system for storing and transporting light weight building material such as timber and hardware.

BACKGROUND

Transporting articles and/or storing articles prior to delivery can be a technical, economic and ecological challenge. Problems that exist in conventional transportation and/or storage system for transporting articles and/or storing articles before delivery request is made are as following: (i) the articles are continuously being moved while piecing together, packing, storing, loading and unloading, which may cause damage to the articles; (ii) a single job may consist of several individual packs of articles of various shapes and sizes; (iii) the articles are packed, stored, loaded and transported as individual packs which is not an efficient way of packing and transporting, and is not cost-effective; and (iv) loading of articles on trucks for delivery/transporting purpose takes a lot of time and if the delivery is delayed due to site issues or natural causes such as rain, after the loading of articles is completed, then the articles are unloaded which leads to further wastage of time and money. Since the loading of the articles requires a combination of manual and mechanical work, such practice at a height can result in damage to the goods and adds a high risk of employees being injured.

Therefore, there is a need for developing a system for transporting articles and/or storing articles temporarily prior to delivery that reduces human effort and facilitates grouping and packing of articles before loading them on the transport, and saves time and money in loading and unloading of a transport vehicle, while consequently reduces the possibility of damage and make the task much safer for employees.

OBJECTS

Some of the objects of the system of the present disclosure which at least one embodiment herein satisfies are as follows:

It is an object of the present disclosure to ameliorate one or more problems of the prior art or to at least provide a useful alternative.

An object of the present disclosure is to provide a modular transportation and storage system that reduces human effort.

Another object of the present disclosure is to provide a modular storage system that is used as a temporary intermediate storage for the articles to be transported from one place to another.

Still another object of the present disclosure is to provide a modular transportation and storage system that takes less time, reduces damage and is cost-effective.

Yet another object of the present disclosure is to provide a modular transportation and storage system that is efficient and safe.

Another object of the present disclosure is to provide a modular transportation and storage system that facilitates high capacity storage of articles.

Still another object of the present disclosure is to provide a more efficient and safe means of storage and transportation of light weight building material and the like.

Other objects and advantages of the present disclosure will be more apparent from the following description when read in conjunction with the accompanying figures, which are not intended to limit the scope of the present disclosure.

SUMMARY OF THE INVENTION

The present invention provides an assembly for storing and transporting light weight goods comprising:
(i) a base adapted to hold goods such as trusses, building material, timber and the like;
(ii) a rack adapted to store the goods on the base; and
(iii) a trailer or truck adapted to transport the goods loaded on the base.

Preferably, the base is equipped with ratchet strap channels which are configured to slide along the length of the base to secure the goods in any position, and the frame structure and extendable gluts are configured to provide slide out support to the base thereby facilitating accommodation of wide loads on the base.

Preferably, the the racks are designed to be self-supporting and capable of holding two or four fully loaded bases.

Preferably, the the racks are modular and can be single or double sided depending on yard layout.

Preferably, the trailer is a lightweight skeletal trailer.

Preferably, the the trailer has airbag suspension to lower the load height and single axle dual wheels for better maneuverability and is equipped with twist locks to quickly attach the loaded bases to the trailer or truck for delivery.

In another aspect, the invention provides a method of storing and transporting light weight goods comprising the steps of:
(i) transferring the goods on a base adapted to support the goods such as trusses, building material, timber and the like;
(ii) stacking of goods into modular racks adapted to store the goods before delivery is required
(iii) loading the goods on the base to a trailer adapted to transport the goods; and
(iv) transporting the goods on the trailer or truck.

In yet another aspect, the present invention provides an assembly for storing and transporting light weight goods comprising:
(i) a base adapted to hold goods such as, building material, sheeting, timber and the like; and
(ii) a truck or trailer adapted to transport the goods on the base wherein the base and truck or trailer comprise male and female connectors.

Preferably, the base is equipped with ratchet strap channels which are configured to slide along the length of the base to secure the goods in any position, and the frame structure and flat tray with dividing pins protect the load from moving and damaging the goods.

Preferably, the bases are independent and can be moved around loaded or unloaded without the need for the truck or trailer to be present.

Preferably, the truck or trailer is a lightweight skeletal type chassis.

Preferably, the truck has airbag suspension to lower the load height and single axle dual wheels for better maneuverability and is equipped with twist locks to quickly attach the load bases to the truck or trailer for delivery.

Preferably, the base and truck or trailer are adapted to receive the connectors which are pyramid shaped.

Preferably, the connectors are recessed into the chassis of the truck or trailer.

In another aspect, the present invention provides a method of storing and transporting light weight goods comprising the steps of:
(i) transferring the goods on a base adapted to support the goods such as sheeting, building material, timber and the like;
(ii) stacking of goods on the base adapted to store the goods before delivery is required;
(iii) loading the goods on the base to a truck or trailer adapted to transport the goods; and
(iv) transporting the goods on the truck wherein the base and truck or trailer comprise male and female connectors.

BRIEF DESCRIPTION OF THE ACCOMPANYING DRAWING

A modular transportation and storage system of the present disclosure will now be described with the help of accompanying drawing, in which.

DETAILED DESCRIPTION

Figure 1:
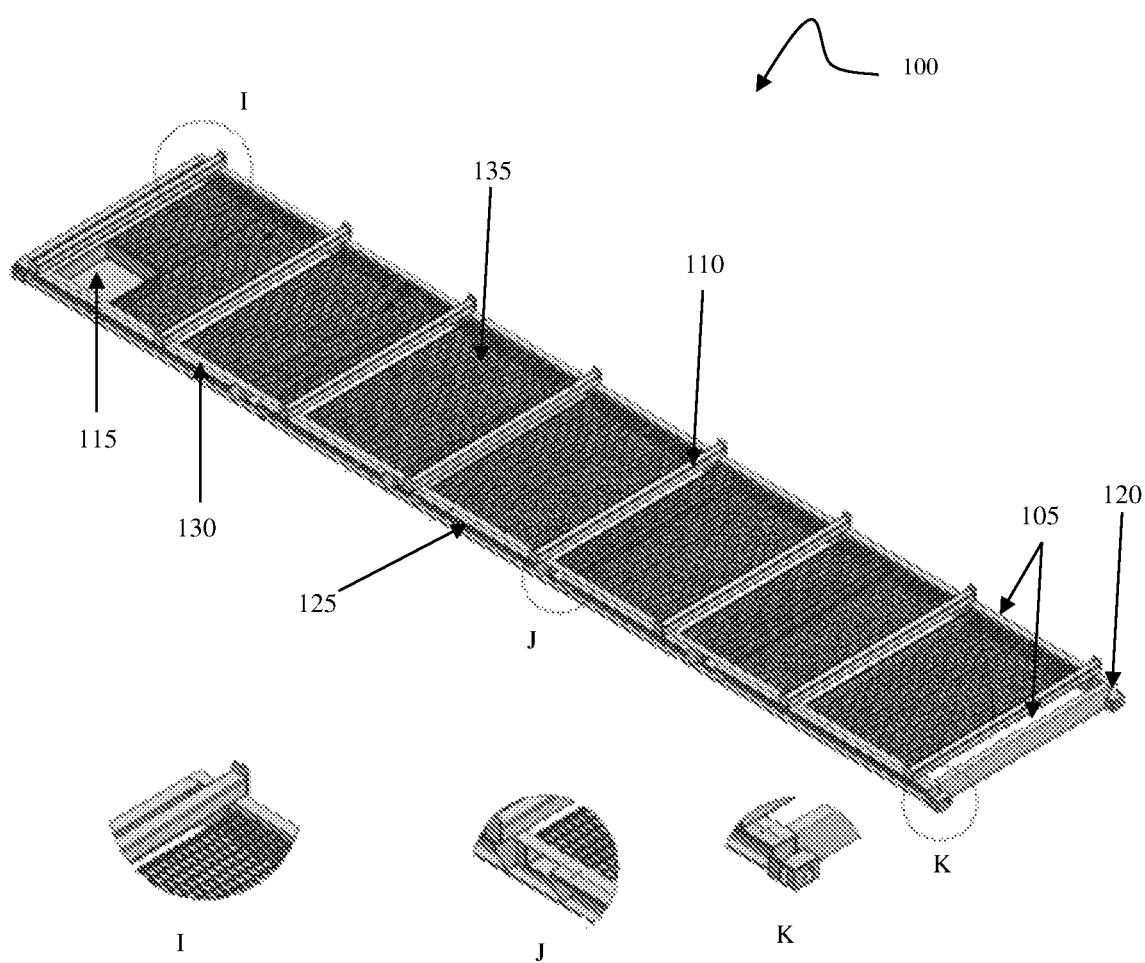
FIG. 1 illustrates an isometric view of a base of the modular transportation and storage system, in accordance with an embodiment of the present disclosure.

Transporting articles and storing articles prior to delivery can be a technical, economic and ecological challenge. Problems that exist in conventional transportation and/or storage system for transporting articles and/or storing articles before delivery request is made are as following: (i) the articles are continuously moving while packing, loading and unloading, which causes damage to the articles (ii) the articles are packed and transported as individual packs which is not an efficient way of packing and transporting, and is not cost-effective, and (iii) loading of articles on trucks for delivery/transporting purpose takes a lot of time and if the delivery is delayed due to site issues or natural causes such as rain, after the loading of articles is completed, then the articles are unloaded which leads to further wastage of time and money. Since the loading of the articles is done both manually and mechanically at a height and also unloading of the articles is done in the same way from a height, employees get injured frequently.

The present disclosure relates to a modular transportation and storage system designed to efficiently store and transport light weight raw material and goods such as timber, trusses, building frames, steel frames and the like. A preferred embodiment of the modular transportation and storage system of the present disclosure will now be described in detail with reference to the accompanying drawings. The preferred embodiment does not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The following description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The present disclosure relates to a transportation and storage system comprising a rack, a base and a modified trailer. The transportation and storage system of the present disclosure, hereinafter also referred as "the system" enables transportation and storage of light weight building material such as timber, trusses and the like. The system allows storage of material prior to loading on a vehicle comprising the modified trailer. The system results in improving storage space, efficiency, cost savings and increased safety. The transportation and storage system of the present disclosure utilizes a lighter one or two axle type of trailer for transport.

Figure 2:
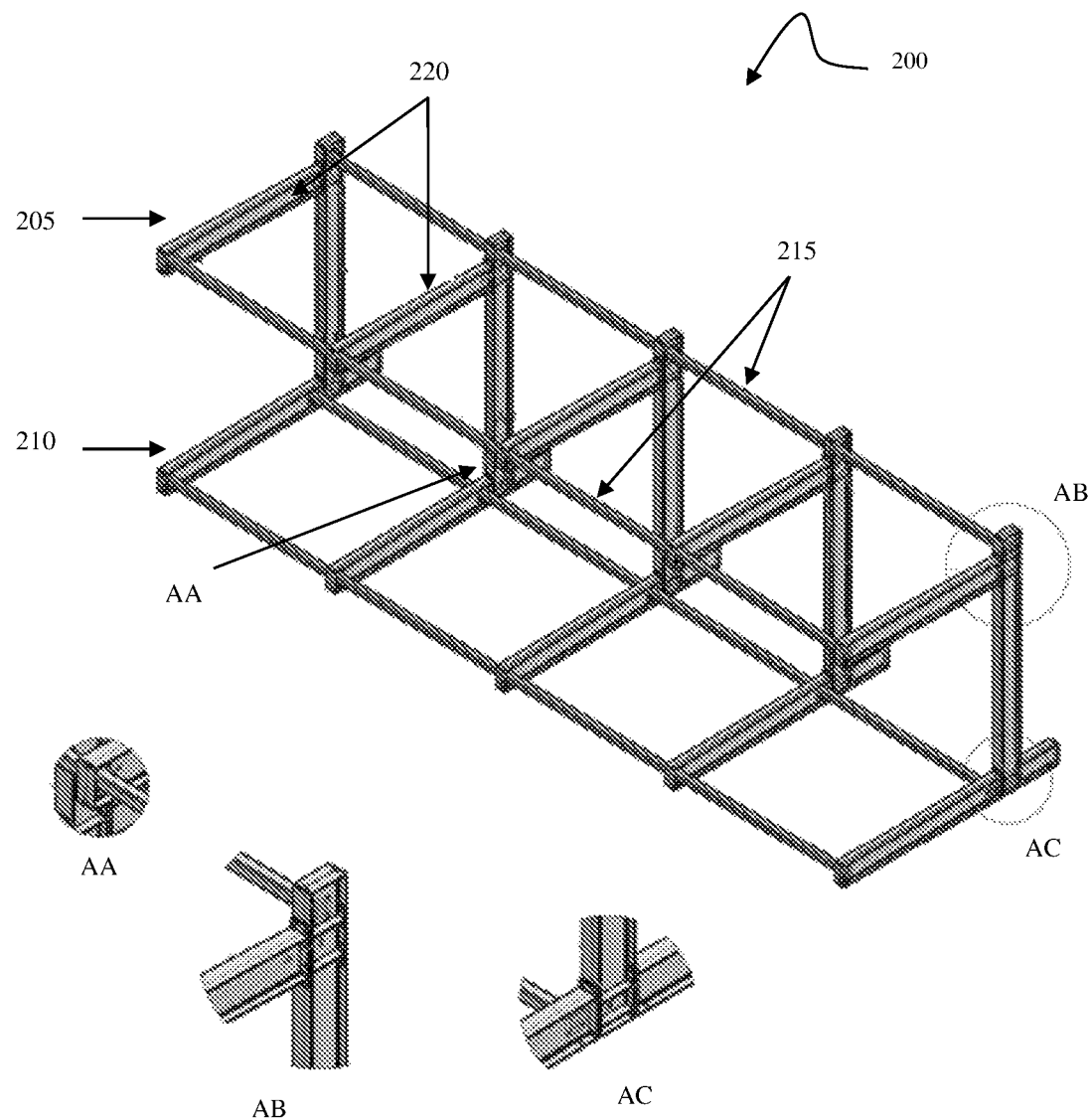
FIG. 2 illustrates an isometric view of a rack of the modular transportation and storage system, in accordance with an embodiment of the present disclosure.
Figure 3:
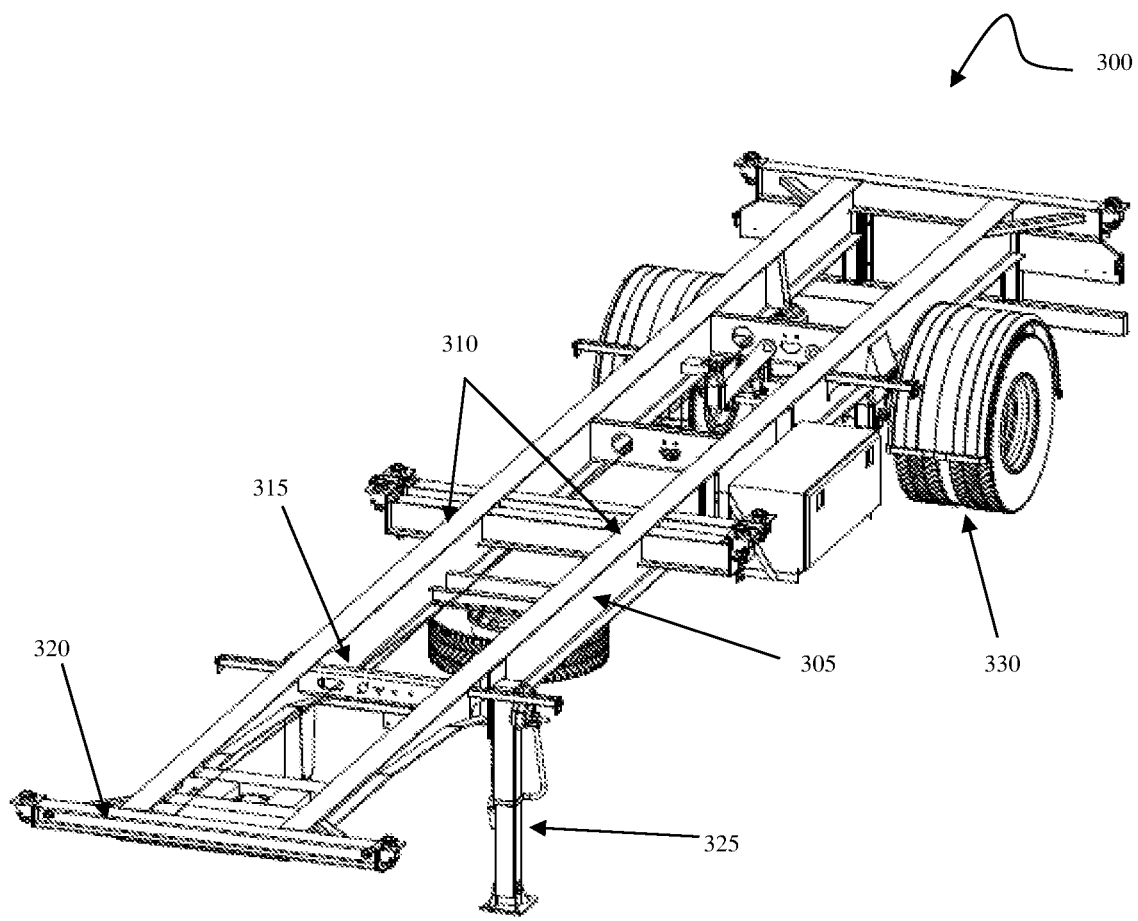
FIG. 3 illustrates an isometric view of a trailer of the modular transportation and storage system, in accordance with an embodiment of the present disclosure.

The modular transportation and storage system as described herein comprises three essential components viz. a base, a rack and a trailer. FIG. 1 illustrates an isometric view of a base 100 of the modular transportation and storage system. The base 100 comprises a frame structure 105, at least one extendable glutz 110, container blocks 120, a PFC extension 130, a plurality of ratchet strap channels 125 and a mesh 135. FIG. 2 illustrates the isometric view of a rack 200 of the modular storage and transportation system. The rack 200 has a C-section like configuration and comprises two holding structures 205, 210, a plurality of bars 215 and a plurality of support plates 220. FIG. 3 illustrates the isometric view of a trailer 300 of the modular storage and transportation system. The trailer 300 is built lightweight and comprises a body frame 305 including a pair of rails 310 and a plurality of support plates 315, an attachment arm 320, a support element 325, at least one pair of wheel 330 and an axle 335.

The frame structure 105 of the base 100 comprises two longitudinal channels (not shown in the figure) and two transverse channels (not shown in the figure) that connect the two longitudinal channels thereby providing a rectangular configuration to the base 100. However, the shape of the base 100 is not limited to be rectangular, and other shapes such as circular, polygonal, triangular, geometric and non-geometric shapes of the base 100 are within the ambit of the present disclosure. The frame structure 105 of the base 100 is made of a high strength but lightweight material/materials. The plurality of extendable glutz 110 are also configured to connect the two longitudinal channels of the frame structure 105 and are disposed on the frame structure 105 of the base 100 in a spaced apart configuration at pre-determined intervals along the length of the longitudinal channels of the frame structure 105 of the base 100. In one embodiment, the frame structure 105 and the plurality of extendable gluts 110 are configured to facilitate wide loads in the base 100 and can be made of light weight material such as aluminium alloys, steel, magnesium alloys, carbon fiber composites, ceramics and the like.

The mesh 135 extends across the width of the transverse channels and along the length of the longitudinal channels of the frame structure 105 of the base 100 and is configured to hold the packed articles that are disposed on the mesh 135. The mesh 135 is made of a strong material to enable a person to walk on and also to hold small items from falling through. In one embodiment, the mesh 135 can be made of a resilient material to provide flexible movement to irregular shaped articles. The container blocks 120 are provided at the corner of the frame structure 105, protruding from one of the transverse channels, and are configured to interlock the base 100 and the trailer 300 when the base 100 is fitted on the trailer 300. The PFC extension 130 is provided along the length of the longitudinal channels of the frame structure 105 of the base 100 and is configured to protect the ratchet strap channels 125, which are configured to hold the ratchet or tie down straps that slide along the length of the base 100. The ratchet strap channels 125 are configured to secure the load at any position along the length of the base 100. The base 100 is manufactured in such a way that the base 100 can be lifted when fully loaded and can be moved into the storage rack 200 before delivery is required. FIG. 1 also depicts an enlarged view of joints of the base 100. The joints are referred as I, J and K. In one embodiment, the frame structure 105, the extendable glutz 110, the PFC extension 130 and the container blocks 120 are made integral to each other by welding process to provide strength to the base 100. The base 100 can be loaded at the ground level, thereby reducing human effort while loading.

In another embodiment, the base 100 further comprises a spring loaded locking means (not shown) to allow extension of the gluts 110.

As shown in FIG. 2, the plurality of bars 215 and the plurality of support plates 220 are connected with each other to form the C-section like configuration of a frame structure of the rack 200. The C-section like configuration of the frame structure comprises the two holding structures 205, 210, wherein each of the holding structures 205, 210 are configured to hold the loaded base 100. The number of holding structures available on the rack 200 is not limited to two and can be more and therefore, the number of holding structures available on the rack 200 does not limit the scope of the present disclosure. In one embodiment, the plurality of bars 215 and the plurality of support plates 220 are made integral to each other by welding process. FIG. 2 also depicts an enlarged view of joints of the rack 200. The joints are referred as AA, AB and AC. Integration of the plurality of bars 215 and the plurality of support plates 220 gives the rack 200 higher strength and load resistance. The rack 200 acts as a modular storage and is configured to temporarily store packed articles before they are transported or delivered. The material used in manufacturing the plurality of bars 215 and/or the plurality of support plates 220 is selected from the group of material that has high wear and tear resistance, corrosion resistance, high tensile strength and high load resistance. The racks 200 are constructed to be self-supporting and capable of holding one or more than one fully loaded base 100. The racks 200 are modular and can be single or double sided depending on yard layout (not shown in the figures). The storage rack 200 is capable of loading the plurality of bases 100, thereby facilitating high capacity storage or multi-pack loading in the transport. In one embodiment, a base can be unloaded from a rack and can be mounted on a trailer for transporting the articles that are loaded on the base. In another embodiment, a multi-layered rack comprising a plurality of loaded bases can be mounted on a trailer directly for transportation of large amount of articles.

As shown in FIG. 3, the pair of rails 310 of the trailer 300 is placed adjacent to each other along the length of the rails 310. The plurality of support plates 315 act as cross members and are configured to connect the pair of rails 310 and are further configured to provide support to the pair of rails 310. The plurality of support plates 315 are in a spaced apart configuration and are disposed at different location at intermittent intervals along the length of the rails 310. In one embodiment, the support plates 315 and the rails 310 can be made of light weight material such as aluminium alloy, steel, magnesium alloys, carbon fiber composites, ceramics and the like. The attachment arm 320 is provided at the front and rear of the trailer 300. The attachment arms 320 are configured to hold the twist locks (not shown in the figures) to attach the base 100 to the trailer 300. In one embodiment, the attachment arm 320 is configured to restrict the movement of the base 100 on the trailer 300. The support element 325 is fitted beneath the trailer 300 and is configured to support the trailer 300. The at least one pair of wheels 330 and a single axle (not shown in the figure) connecting the pair of wheels 330 are provided for better maneuverability. The trailer 300 further comprises an airbag suspension subsystem (not shown in the figures) to assist in lowering the load height. Twist locks (not shown in the figures) are fitted to the attachment arms 320 to quickly attach the loaded bases 100 to the trailer 300 for delivery. The modular transportation and storage system for transportation and temporary storage of articles reduces human effort and also facilitates high storage capacity, grouping and packing of articles before loading them, and loading, unloading and transportation of multiple packs of articles.

Furthermore, the loading process can be completed without the expense of having a truck and driver waiting, thereby saving money. The placement of multiple items is made safer and easier by loading the articles at low level rather than at an elevated position. For example, goods/articles for delivery can be prepared and slung ready for lifting off by a crane, and can be securely fastened down on the base, at ground level. Once loaded and secured, the base can be moved around without causing damage to the goods. The racks are designed to allow wide loads up to 3600 mm wide to be secured and safely stored in the upper level. The combination of the use of the base and the rack system according to the present disclosure at least doubles or even quadruples the yard footprint, depending on the manner in which the goods/articles are loaded.

The terms trailer and truck may be interchangeable as appropriate throughout the specification.

The present applicant is a building supply company that delivers various building materials to building sites. The assembly and system according to the present invention could be adopted by any other goods and services company that loads and unloads multiple items on a truck.

In another aspect, the present invention provides a modified lightweight truck with multiple bases to store goods, pre-load and secure ready for delivery.

The focus of this system was to make a difficult process easier and safer, while at the same time increasing productivity and reducing costs.

The Current Process

The business organisations involved in the industry related to storing and transporting building material are faced with a difficult, time consuming and somewhat dangerous task for loading multiple items of various weight, size and fragility onto a waiting truck at height using both manual and mechanical methods.

In any single load there can be hundreds of individual items and these need to be loaded onto the vehicle tray in an order that they will be required to be delivered and in such a way that they will not be damaged in this uploading and delivery process.

Many of the items are awkward in shape and weight, some are fragile or easily damaged and need to be manually handled. The loading of these items takes a long time and the truck needs to be idle while the loading process is in progress, thereby decreasing both productivity and efficiency.

According to the present common practice as used in the industry, while it is possible to pre-assemble some of the items, the items cannot be loaded until the vehicle returns to the yard.

It is a very manual task of unloading these goods on various building sites, often carrying the goods from the road. For this reason, each vehicle may have a designated driver and one or two co-workers or assistants.

When a truck returns to the yard to be reloaded, the Driver and the co-workers have to wait idly while their vehicle is reloaded.

Often it may take several hours to properly load and secure a full truck load, almost as long as it takes to deliver the goods. Hence, this current process is very expensive and unproductive.

Furthermore, loading items onto the raised tray of a vehicle can be difficult and increases the risk of injury. In securing this load, a worker will often have to climb on the load to ensure that the straps are in the correct position and that the fragile goods are adequately protected and secured.

It is difficult to check that all of the goods are loaded correctly due to the height of the load and pressure to get the truck out of the site and onto the road for delivery.

The Problems Needed to be Overcome

Hence, there is a need to be able to prepare the goods for the next delivery run while the vehicle and drivers are still out working.

Furthermore, there is a need to be able to work at a safer height.

Moreover, there is a need to have time to load the truck without the pressure of waiting drivers.

The current practice and process is very expensive and unproductive and needs to be made more efficient and effective in order to increase productivity and efficiency and increase safety of workers.

There is also a need to be able to secure the load to the tray without climbing on the load at height.

There is also a need to be able to check the accuracy of the load properly.

Idea

The concept according to the present invention relies on developing a system by replicating or creating an assembly comprising multiples of a modified tray or base structure which effectively represents the tray of the truck without the truck connected under it.

Obstacles

The tray of a truck is supported by the chassis, what will support this tray?

The tray of a truck is moved around by the truck, how to move this tray?

The tray of a truck has rope rails or load binding straps below it to secure the load, how to incorporate this feature without damaging the goods?

The tray of a truck is bolted on to the truck in several locations, how to accomplish this?

The tray of a truck is carefully positioned to the chassis during manufacture, how to safely without causing damage, position such a heavy load on to the chassis of the truck several times a day?

The Solution

The solution to the above mentioned problems is to:
(i) effectively design a lightweight tray the size of the truck tray that is strong enough to carry the required load without the support of the truck chassis;
(ii) Design fork tine receivers into the tray to enable the tray to be lifted by a forklift;
(iii) Recess load binding ratchet straps into the side of the base so they will not be damaged when it is placed on the ground;
(iv) Design outrigger supports on the truck chassis that can also be used to secure the tray to the truck quickly and safely; and
(v) Design locating pyramids on the truck chassis and receivers into the underside of the trays to ensure positive positioning every time.

Moreover, the truck or trailer assembly as described above may be adapted to accommodate or facilitate transportation and storage of building materials by incorporating features of one or more aspects of the invention as described above.

Figure 6:
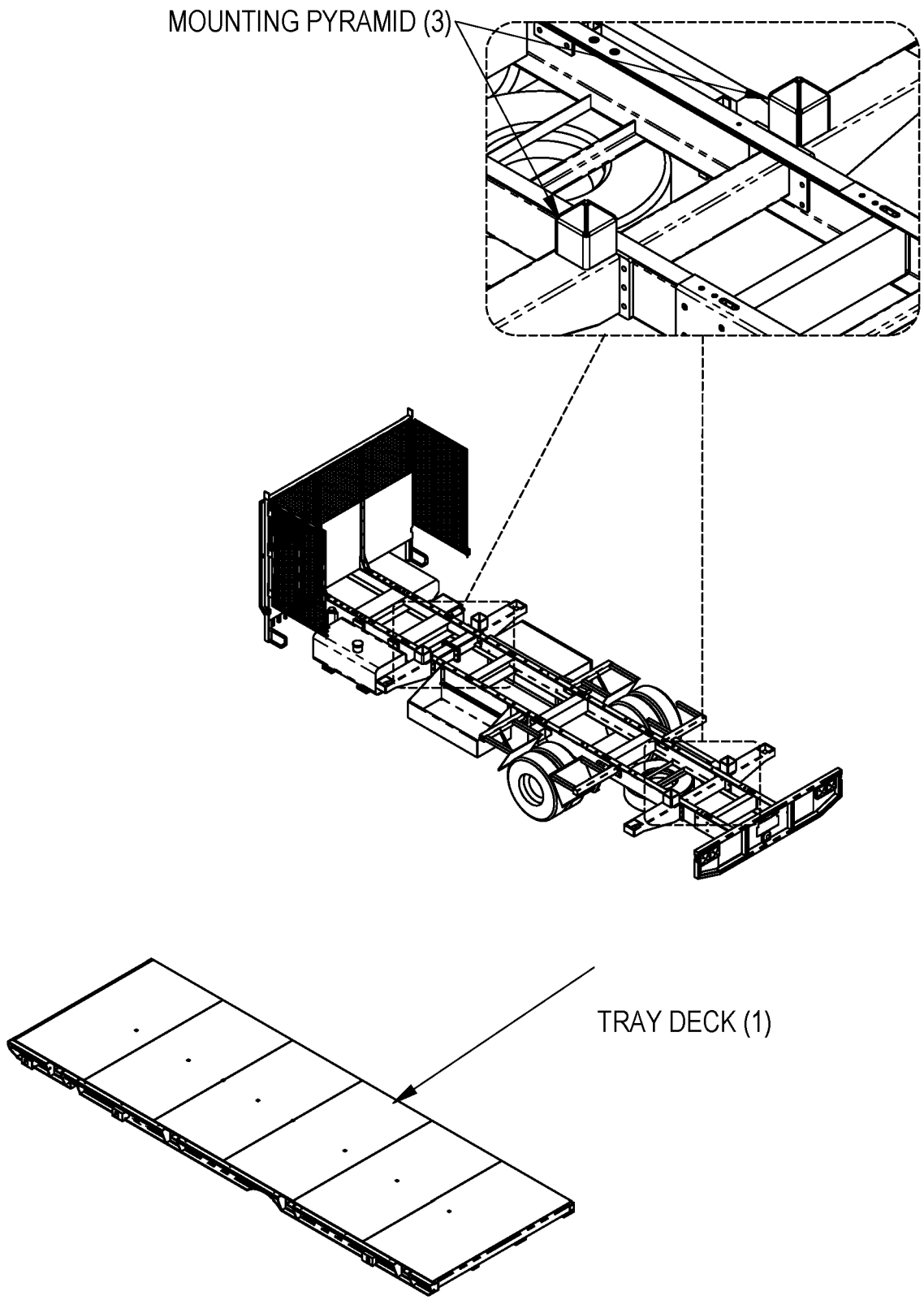
FIG. 6 shows the mounted pyramid (3) as an embodiment of the present invention.

For example, the trailer 300 may be adapted to receive the male and female connectors or locators 3 and 4, also described as mounting pyramid and mounting receptacle as shown in FIG. 6.

The base according to the present invention comprises many formats, and is not limited to an open base. It may be a closed in pantechnicon, a tautliner or grate of some type.

The base is adapted such that it can be removed from the trailer or truck to be stored and loaded at a safer level and without the presence of the truck or trailer.

When ready for delivery the pyramid locators make it a simple and safe process to be put back on the trailer or truck. The container locks or optional auto locking pins secure the base to the transport vehicle.

Bases can be pre-loaded and stored if need be, awaiting the return of the transport vehicle.

Figure 4:
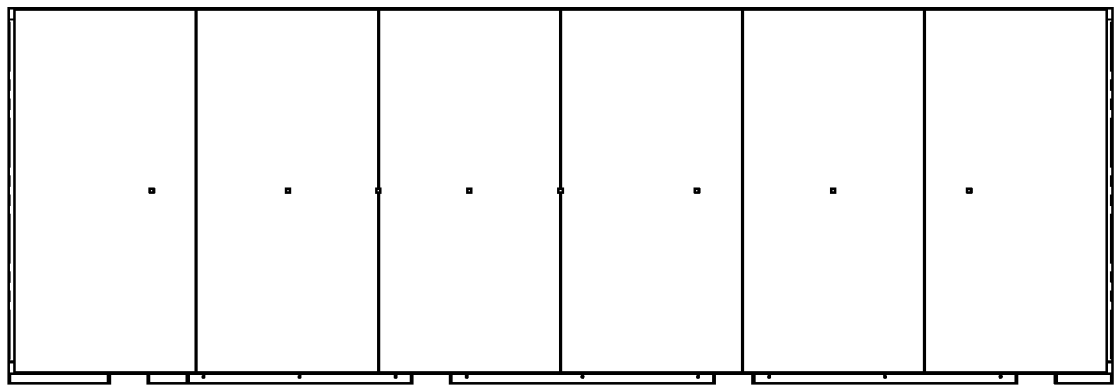
FIG. 4 shows the tray deck (1) as an embodiment of the present invention.
Figure 4:
Figure 4:
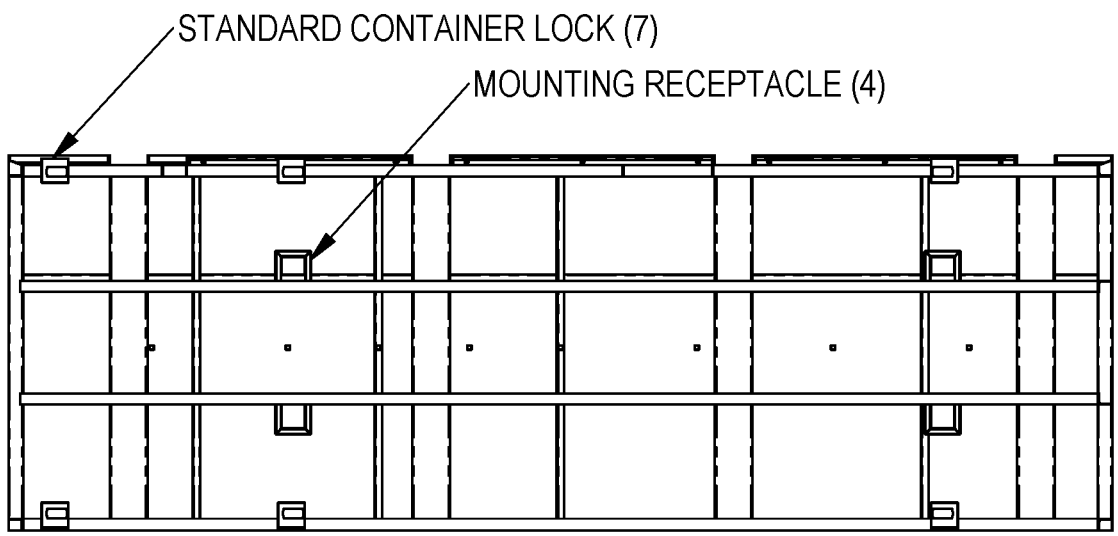

FIG. 4 shows the tray deck (1) an embodiment of the present invention.

TRAY DECK (1)—Modular tray can be loaded on the ground and quickly mounted to a truck chassis.

Figure 5:
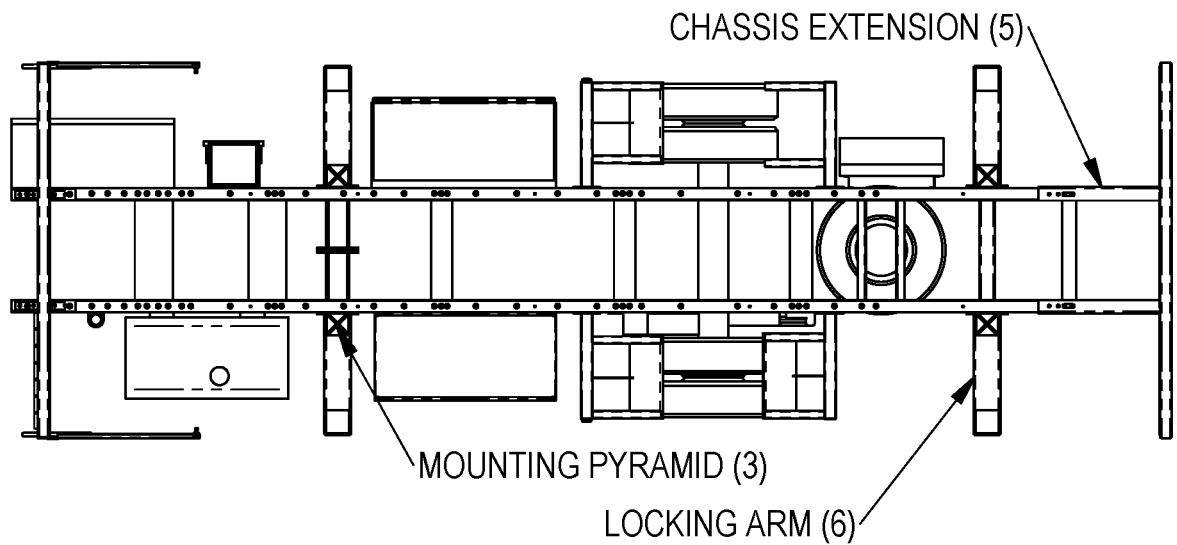
FIG. 5 shows the modified chassis (2) as an embodiment of the present invention.
Figure 5:
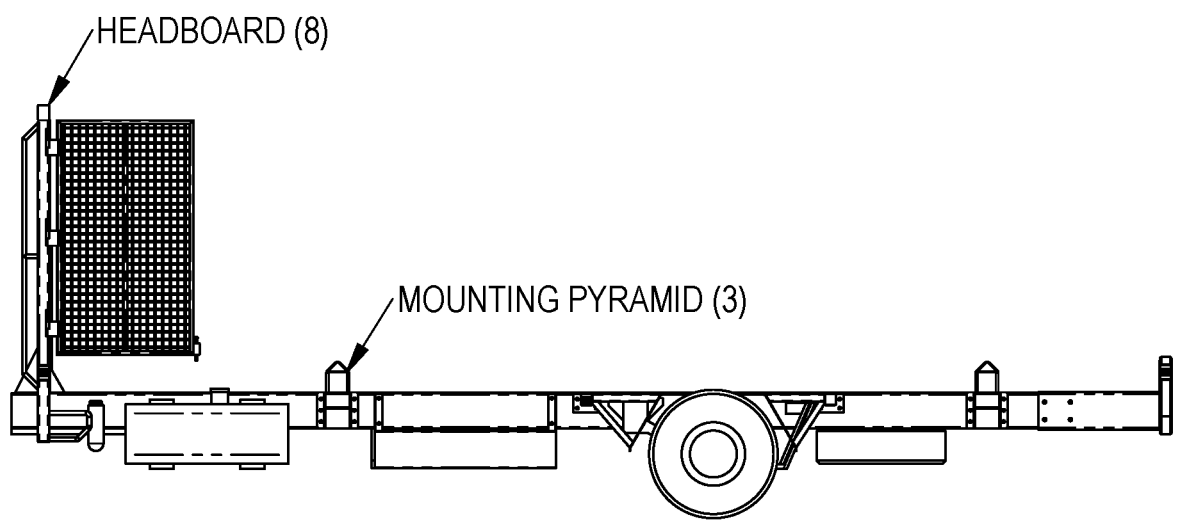

FIG. 5 shows the modified chassis (2) an embodiment of the present invention.

MODIFIED CHASSIS (2)—Chassis that has been specially modified to receive a modular tray deck. Modifications include: chassis rail strength upgrade, chassis length extension, addition of headboard to protect cab from cargo and assist with loading of tray and the addition of mounting pyramids and container lock support arms.

FIG. 6 shows the mounted pyramid (3) an embodiment of the present invention.

MOUNTING PYRAMID (3)—Pyramid shaped spigot designed to fit inside mounting receptacle embedded in the modular tray.

MOUNTING RECEPTICLE (4)—Angled faced hole designed to accept a mounting pyramid that is mounted on a chassis.

CHASSIS EXTENSION (5)—Additional length of chassis rails added to a chassis supporting a tailboard complying with ADR.

LOCKING ARM (6)—Arm mounted to truck chassis that houses a container locking mechanism.

Standard Container Lock (7)

HEADBOARD (8)—Safety barrier that protects the truck cab from cargo that may shift during transport.

Figure 7:
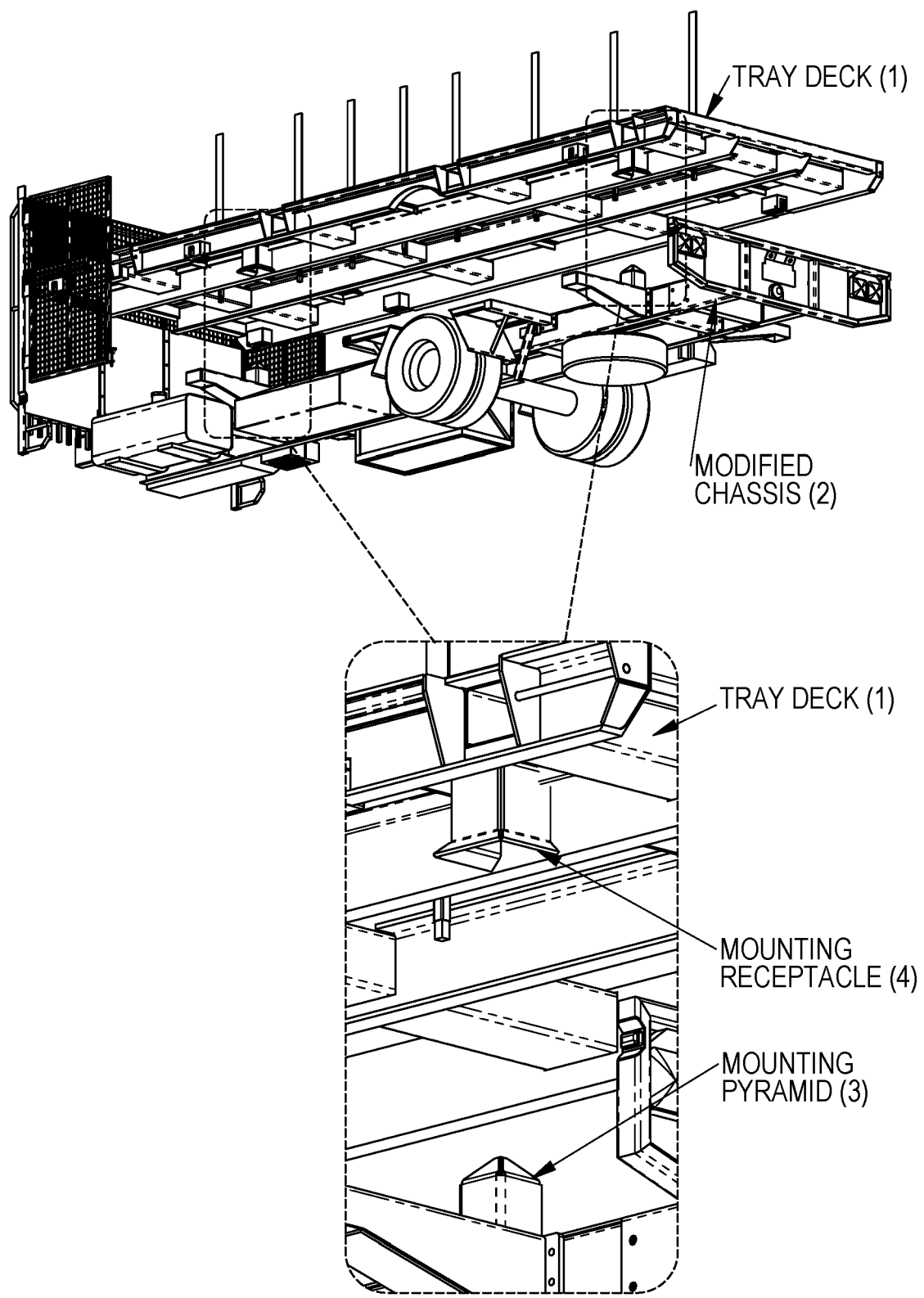
FIG. 7 shows the loading procedure as an embodiment of the present invention.
Figure 8:
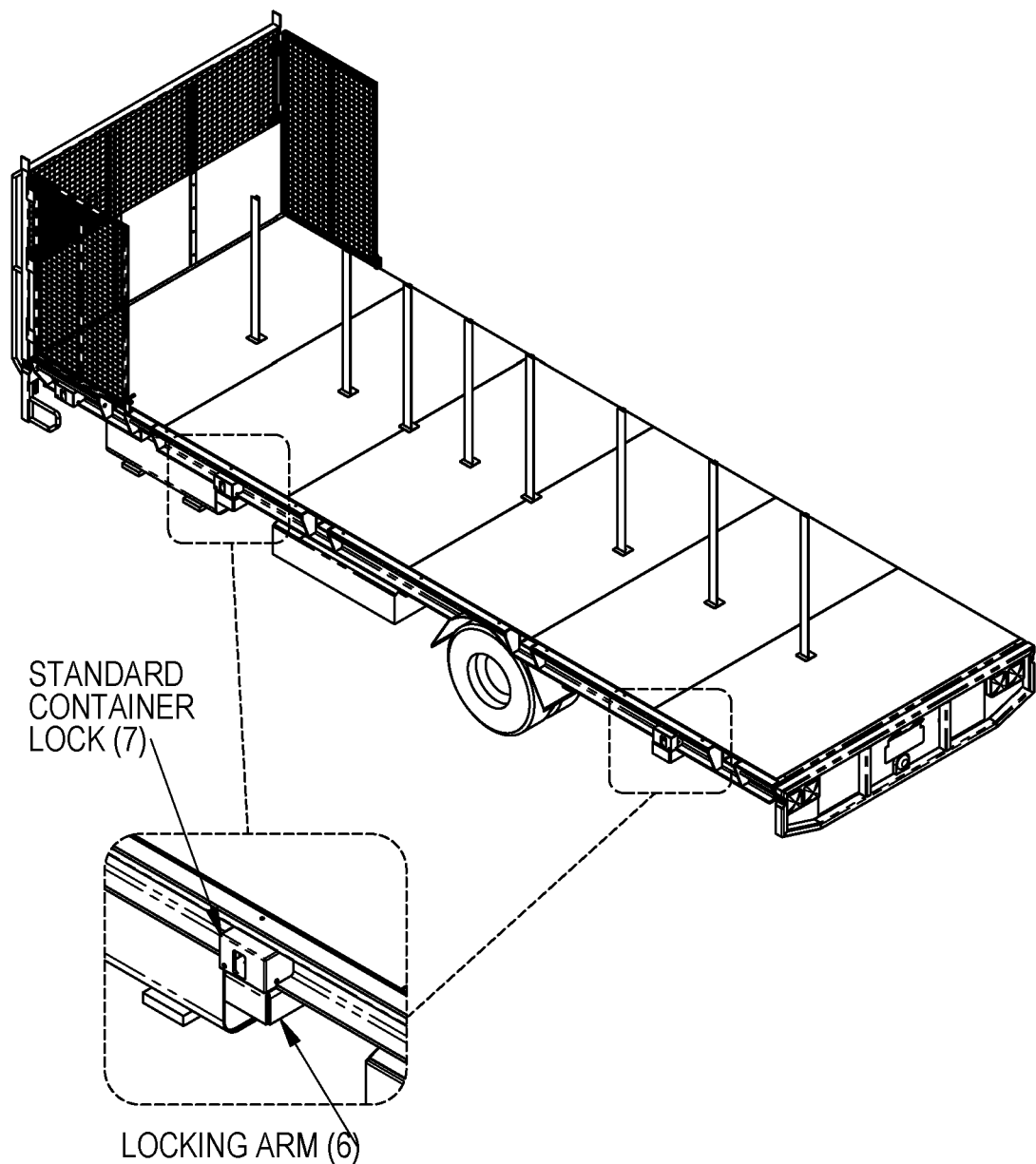
FIG. 8 shows the loading procedure as an embodiment of the present invention.

Furthermore, the loading procedure is illustrated in FIGS. 6, 7 and 8 as an embodiment of the present invention.

FIG. 6 illustrates

Loading Procedure:

Step 1:

Tray deck (1) to be loaded with cargo on the ground prior to arrival of the truck (2)

FIG. 7 illustrates

Loading Procedure:

Step 2:

The tray deck (1) loaded with cargo is positioned above the truck chassis (2) using a forklift.

The tray deck (1) is lowered onto the chassis (2), during this process the first point of contact is the angled faces of the mounting pyramids (3) which interlock with the angled faces of the mounting receptacles (4).

These mounting features (3&4) align the deck (1) with the chassis (2) as it is lowered into position for transport.

The mounting features (3&4) are also engineered to transfer all lateral forces from the tray (1) to the chassis (2)

FIG. 8 illustrates

Loading Procedure:

Step 3:

Once positioned on the chassis, the tray (1) is secured to the chassis (2) by container locks (7).

All upward vertical forces of the tray (1) are transferred to the Chassis (2) through container locks (7) and locking arms (6).

Legend FIGS. 4-8

TRAY DECK (1)—Modular tray can be loaded on the ground and quickly mounted to a truck chassis.

MODIFIED CHASSIS (2)—Chassis that has been specially modified to receive a modular tray deck. Modifications include: chassis rail strength upgrade, chassis length extension, addition of headboard to protect cab from cargo and assist with loading of tray and the addition of mounting pyramids and container lock support arms.

MOUNTING PYRAMID (3)—Pyramid shaped spigot designed to fit inside mounting receptacle embedded in the modular tray.

MOUNTING RECEPTICLE (4)—Angled faced hole designed to accept a mounting pyramid that is mounted on a chassis.

CHASSIS EXTENSION (5)—Additional length of chassis rails added to a chassis supporting a tailboard complying with ADR.

LOCKING ARM (6)—Arm mounted to truck chassis that houses a container locking mechanism.

Standard Container Lock (7)

HEADBOARD (8)—Safety barrier that protects the truck cab from cargo that may shift during transport.

Technical Advancements and Economic Significance

The modular transportation and storage system, in accordance with the present disclosure described herein above has several technical and economic advantages including but not limited to providing a system that:

reduces human effort;

provides a temporary intermediate storage for the articles to be transported from one place to another;

increases storage/yard space;

takes less time and is cost-effective; and that is efficient and safe.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or mixtures or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form part of the prior art base or were common general knowledge in the field relevant to the disclosure, as it existed anywhere before the priority date of this application.

The systems and methods are not limited to the specific embodiments described herein. In addition, components of each system and each method can be practiced independently and separately from other components and methods described herein. Each component and method can be used in combination with other components and other methods.

While considerable emphasis has been placed herein on the specific features of the preferred embodiment, it will be appreciated that many additional features can be added and that many changes can be made in the preferred embodiment without departing from the principles of the invention. These and other changes in the preferred embodiment of the invention will be apparent to those skilled in the art from the disclosure herein, whereby it is to be distinctly understood that the foregoing descriptive matter is to be interpreted merely as illustrative of the invention and not as a limitation.

The claims defining the invention are as follows:

1. A detachable load tray configured for placement over a chassis of a delivery truck, comprising:

an upper surface, a lower surface, a first longitudinal side, a second longitudinal side, a front end and a rear end, said surfaces and ends forming a generally rectangular base configured to substantially overlie the chassis of the delivery truck when engaged thereto;

a plurality of fork lift tine receivers extending into at least one of said longitudinal sides; and a plurality of mounting receptacles extending into said lower surface of said base, each of said mounting receptacles having an angled inner surface configured to engage an angled projection extending from the chassis of the truck so that placement of the tray is at least partially self-guided when engaging the load tray with the chassis, each mounting receptacle having an inner surface with four sides, each side being angled and oriented along a plane, the planes of each of said sides intersecting to form an apex of a pyramid.

2. The load tray of claim 1, wherein each mounting receptacle includes an outwardly extending flanged lip around a lower perimeter of said receptacle.

3. The load tray of claim 1, wherein each mounting receptacle has a generally square outer transverse cross section.

4. The load tray of claim 1, wherein each receptacle has a wall extending outwardly from said lower surface.

5. The load tray of claim 1, where each of said mounting receptacles is positioned proximate a corner of said base.

6. The load tray of claim 1, wherein said plurality of mounting receptacles number four.

7. The load tray of claim 1, wherein said upper surface includes a mesh.

8. A detachable load tray configured for placement over a chassis of a delivery truck, comprising:
   an upper surface, a lower surface, a first longitudinal side, a second longitudinal side, a front end and a rear end, said surfaces and ends forming a generally rectangular base configured to substantially overlie the chassis of the delivery truck when engaged thereto;
   a plurality of fork lift tine receivers extending into at least one of said longitudinal sides; and
   a plurality of mounting receptacles extending into said lower surface of said base, each of said mounting receptacles having an angled inner surface configured to engage an angled projection extending from the chassis of the truck so that placement of the tray is at least partially self-guided when engaging the load tray with the chassis, said base having a height from said lower and to said upper surface, each mounting receptacle having a wall extending outwardly from said lower surface, said wall having a height substantially the same as the height from said lower surface to said upper surface.

9. A partially-self-guided modular transportation system, comprising:
   a chassis including a frame with an upper surface, said chassis having a plurality of mounting projections protruding from said upper surface; and
   a load tray having a lower surface, said lower surface of said load tray including a plurality of mounting receptacles configured to respectively engage said plurality of mounting protections so that vertical lowering of said load tray onto said chassis is at least partially guided by sliding engagement of said plurality of mounting projections with said plurality of mounting receptacles, each mounting receptacle having an inner surface with four sides, each side being angled and oriented along a plane, the planes of each of said sides intersecting to form an apex of a pyramid.

10. The system of claim 9, wherein said mounting projections are each shaped as a pyramid at an engagement end.

11. The system of claim 9, wherein each mounting receptacle includes an outwardly extending flanged lip around a lower perimeter of said receptacle.

12. The system of claim 9, wherein each mounting receptacle has a generally square outer transverse cross section.

13. The system of claim 9, wherein each receptacle has a wall extending outwardly from said lower surface of said loading tray.

14. The system of claim 9, where each of said mounting receptacles is positioned proximate a corner of said loading tray.

15. The system of claim 9, wherein said plurality of mounting receptacles number four.

16. The system of claim 9, wherein said loading tray includes an upper surface with a mesh.

17. The system of claim 9, in combination with a loading rack dimensioned to receive said loading tray after said loading tray is disengaged from said chassis.

18. The system of claim 9, wherein said loading tray includes a plurality of forklift tine receivers through a side wall of said loading tray.

* * * * *